US010713433B2

(12) United States Patent
Martin et al.

(10) Patent No.: US 10,713,433 B2
(45) Date of Patent: Jul. 14, 2020

(54) DOCUMENTATION DATA FILE WITH DETAIL LEVELS

(71) Applicant: BULL SAS, Les Clayes Sous Bois (FR)

(72) Inventors: Stéphane Martin, Echirolles (FR); Philippe Couvee, Villard Bonnot (FR); Mireille Cheinet, Saint Egreve (FR)

(73) Assignee: BULL SAS, Les Clayes Sous Bois (FR)

( * ) Notice: Subject to any disclaimer, the term of this patent is extended or adjusted under 35 U.S.C. 154(b) by 147 days.

(21) Appl. No.: 14/394,068

(22) PCT Filed: Apr. 11, 2013

(86) PCT No.: PCT/FR2013/050781
§ 371 (c)(1),
(2) Date: Oct. 10, 2014

(87) PCT Pub. No.: WO2013/153331
PCT Pub. Date: Oct. 17, 2013

(65) Prior Publication Data
US 2015/0082141 A1 Mar. 19, 2015

(30) Foreign Application Priority Data
Apr. 12, 2012 (FR) .................................... 12 53351

(51) Int. Cl.
*G06F 40/131* (2020.01)
*G06F 40/197* (2020.01)
*G06F 40/14* (2020.01)
*G06F 40/106* (2020.01)
*G06F 40/134* (2020.01)

(52) U.S. Cl.
CPC .......... *G06F 40/197* (2020.01); *G06F 40/106* (2020.01); *G06F 40/131* (2020.01); *G06F 40/134* (2020.01); *G06F 40/14* (2020.01)

(58) Field of Classification Search
CPC ..................................................... G06F 40/131
See application file for complete search history.

(56) References Cited

U.S. PATENT DOCUMENTS

| | | | | |
|---|---|---|---|---|
| 2001/0027460 | A1* | 10/2001 | Yamamoto | G06F 17/218 |
| | | | | 715/229 |
| 2002/0138331 | A1* | 9/2002 | Hosea | G06Q 10/06375 |
| | | | | 705/7.37 |
| 2005/0039121 | A1* | 2/2005 | Cleveland | B42D 1/00 |
| | | | | 715/256 |

(Continued)

OTHER PUBLICATIONS

"Getting started with XPath" by Bertrand Portier, dated May 11, 2004 and retrieved from https://www.ibm.com/developerworks/xml/tutorials/x-xpath/x-xpath-pdf.pdf (Year: 2004).*

(Continued)

*Primary Examiner* — Sanchita Roy
(74) *Attorney, Agent, or Firm* — Pillsbury Winthrop Shaw Pittman LLP

(57) ABSTRACT

A method and device is described for saving a documentation data file intended for being displayed on a screen. The method includes subdividing the documentation data into data blocks; associating a detail level with at least one data block; and saving the data block with a level marker relating to the associated detail level, the marker intended to be compared with a desired detail level in order to display the data on the screen.

35 Claims, 5 Drawing Sheets

(56) References Cited

U.S. PATENT DOCUMENTS

| | | | | |
|---|---|---|---|---|
| 2006/0064504 | A1* | 3/2006 | Rechterman | G06Q 10/107 709/238 |
| 2008/0228590 | A1* | 9/2008 | Johnson | G06Q 30/0601 705/26.1 |
| 2009/0037820 | A1* | 2/2009 | Bodin | G06F 17/211 715/730 |
| 2009/0199302 | A1* | 8/2009 | So | G06F 21/6218 726/27 |
| 2011/0231930 | A1* | 9/2011 | Howarth | G06F 17/30867 726/21 |

OTHER PUBLICATIONS

"Top Ten Tips to Using XPath and XPointer" by John E. Simpson, dated Aug. 21, 2002, retrieved from https://www.xml.com/pub/a/2002/08/14/xpath_tips.html (Year: 2002).*

Kristen James Eberlein et al., "Darwin Information Typing Architecture (DITA) Version 1.2", Dec. 1, 2010, XP055041453, Retrieved from the Internet: URL: http://docs.oasis-open.org/dita/v1.2/spec/DITA1.2-spec.pdf [retrieved on Oct. 18, 2012].

France Baril, "DITA—The mechanics of a single sourcing project", Proceedings of Extreme Markup Languages Conference, Aug. 2, 2004, pp. 1-13.

Martin Meyer, "Kriterienbasierter Vergleich von WYSIWYG-DITA-XML-Editoren", May 2, 2007, XP055041469, Retrieved from the Internet: URL:https://www2.cs.fau.de/EN/teaching/thesis/download/i2D00360.pdf [retrieved on Oct. 18, 2012].

Stephanie Lovering et al., "DITA—A White Paper", 2010, pp. 1-10, XP055041460, Retrieved from the Internet: URL:http://stephanielovering.com/files/DitaWhitepaper.pdf [retrieved on Oct. 18, 2012].

International Search Report for International Application No. PCT/FR2013/050781 dated Jun. 5, 2013 by European Patent Office.

* cited by examiner

DOCUMENTATION DATA FILE WITH DETAIL LEVELS

CROSS REFERENCE TO RELATED APPLICATIONS

This application is a nationalization of and claims priority to PCT/FR2013/050781, filed on Apr. 11, 2013, which claims the benefit of priority to French Application No. 1253351, filed on Apr. 12, 2012. The disclosure of each of the above-described applications is hereby expressly incorporated by reference in their entirety.

BACKGROUND

Technological Field

The present application relates to the saving and display of documentation data from a documentation data file.

Description of the Related Technology

Companies designing high-technology products the implementation of which is complex (for example computer software, high-performance calculators, etc.) provide their clients and users of these products with one or more sets of technical documentation, usually in electronic form (CD-ROM, DVD-ROM, USB key, or other).

This documentation is very detailed as the products in question may be aimed simultaneously at a wide range of users, from the least qualified to the most experienced. This level of detail can however make this documentation difficult to use, in particular when the level of detail does not correspond to the level of the reader's technical knowledge.

SUMMARY OF CERTAIN INVENTIVE ASPECTS

The inventors have thus identified a need for a novel documentation file format making it possible to adapt the content displayed, in particular the detail level of this content, to the file user.

The present application falls within this context.

A first embodiment relates to a method for saving a data file for documentation intended for display on a screen, comprising the following:
  subdividing the documentation data into data blocks,
  associating a detail level with at least one data block, and
  saving the data block with a level marker relating to the associated detail level, the marker intended to be compared with a detail level desired for displaying the data on the screen.

The method can be implemented by information technology means, for example by means of word-processing software.

According to the present application, it is possible, in one and the same file representing a document (with text, images etc.), to have several versions of an element of the document with different detail levels. This offers the possibility, when the document is edited on a screen, of choosing a display level depending on a desired detail level.

Thus, when documentation relating, for example, to a complex product and aimed at a wide range of users is created, it is possible to include several detail levels therein. Each user, according to his technical expertise, can then choose a display detail level.

The method can also comprise saving a link marker with the data block in order to make a documentation link to at least one other data block of the file.

Thus, it is possible to link the different versions of an element of the document.

For example, the link marker gives a detail level associated with the at least one linked block.

Thus, in addition to specifying the links between the different versions of the element, it is possible to know the detail level of each version.

It is thus possible to present to the user, for an element of the document, the different detail levels available. It is also possible to choose, from the available versions, the one most suited to a display level specified for displaying the file data.

For example, at least one of the level marker and the link marker is an item of metadata.

Such a type of data is simple and effective to implement.

The documentation data can for example, comprise text data, image data, or other data.

For example, the file is in XML (eXtended Markup Language) format.

A second embodiment relates to a method for displaying documentation data of a file, comprising the following:
  comparing a level marker, in the file, relating to a detail level associated with a data block of the file, with a display detail level for displaying the data block, and
  generating a display signal of the data of the block if the level marker corresponds to the display detail level.

The method can be implemented by information technology means.

The method can also comprise determining, from a link marker with the data block, in the file, a documentation link with at least one other data block of the file.

The method can also comprise generating a display signal of the link.

The method can also comprise determining, from the link marker, a detail level of the at least one other data block.

The method can also comprise generating a display signal of the detail level of the at least one other data block.

For example, the signals generated are sent to a display device such as a screen.

For example, at least one of the level marker, the link marker and the indicator is an item of metadata.

For example, the file has been saved according to the first embodiment.

A third embodiment relates to computer readable products encoded with instructions as well as computer program products and storage media for such instructions and products, allowing the implementation of methods according to the first and/or the second embodiments, when the instructions are stored in a memory of a documentation data file saving device or of a documentation data display device and executed by a processor of such devices.

A fourth embodiment relates to a medium for saving data comprising the documentation data saved according to the first embodiment.

For example, the data saving medium comprises a first saving section for storing a detail level marker relating to a data block associated with the first saving section.

For example also, the data saving medium comprises a second saving section for storing a documentation link marker relating to a connection between a data block associated with the second section and at least one other data block.

The second data section can comprise a saving subsection for storing a detail level marker for each at least one other linked data block.

A fifth embodiment relates to a device configured to implement a method according to the first embodiment. Such a device for saving a data file for documentation intended for display on a screen comprises a processing unit configured to subdivide the documentation data into data blocks, associate a detail level with at least one data block, and save the data block with a level marker relating to the associated detail level, the marker intended to be compared with a detail level desired for displaying the data on the screen.

The processing unit can also be configured to save a link marker with the data block to make a documentation link to at least one other data block of the file.

The link marker can give a detail level associated with the at least one linked block.

At least one of the level marker and the link marker can be an item of metadata.

The documentation data can comprise text data, image data, or other data.

The file can be in XML (eXtended Markup Language) format.

A sixth embodiment relates to a device to implement a method according to the second embodiment. Such a device to display documentation data of a file comprises a processing unit configured to determine a display detail level for displaying a data block of the file, compare a level marker, in the file, relating to an associated detail level with the data block with the predetermined display detail level, and generate a display signal of the data of the block if the level marker corresponds to the display detail level.

The processing unit can also be configured to determine, from a link marker with the data block, in the file, a documentation link with at least one other data block of the file.

The processing unit can also be configured to generate a display signal of the link.

The processing unit can also be configured to determine, from the link marker, a detail level of the at least one other data block.

The processing unit can also be configured to generate a display signal of the detail level of the at least one other data block.

At least one of the level marker, the link marker and the indicator can be an item of metadata.

For example, the file was saved according to a method according to the first embodiment.

The subjects according to the second, third, fourth, fifth and sixth embodiments provide at least the same advantages as those provided by the method according to the first embodiment. The devices can comprise means for implementing optional features referred to in the case of the first and the second embodiments in method terms.

BRIEF DESCRIPTION OF THE DRAWINGS

Other features and advantages will become apparent on reading the present detailed description which follows, by way of a non-limitative example, of Annexes 1 and 2 illustrating respectively a DTD grammar and an XML, file according to embodiments, as well as annexed figures among which.

DETAILED DESCRIPTION OF CERTAIN ILLUSTRATIVE EMBODIMENTS

In the description which follows, a novel data format is presented, allowing a user to adapt the detail level of the data that he consults in an electronic file depending on his needs. The user can thus display details for parts which are less familiar to him and display less detailed parts for the parts with which he is more familiar.

Generally, this is a file format in which data (for example metadata) are saved with a "precision (or "detail") level" for each element constituting the document (for example a chapter, a paragraph, a figure, or other element). These data can be specified by a user when the data file is saved. For example, he selects a number of possible detail levels (one, two, three, or even more), then assigns one of these levels to various elements of the document represented by the file.

During the display (or visualization) of the file, the detail level data (for example metadata) are interpreted to present to the user the possibility of consulting the different detail levels available for such and such a part of the document.

Several implementations of this display are possible. It is possible to envisage the display of several windows arranged side by side with each displaying different detail levels for an element of the document. In such an embodiment, coordination between the windows is provided for displaying the same parts of the document in a coordinated manner but according to different detail levels. Alternatively or in combination, these windows are not presented simultaneously but opened at the user's request. Elements, which can for example be clicked on, are presented to the user to indicate to him the possibility of opening a new window with a new detail level.

Figure 1:
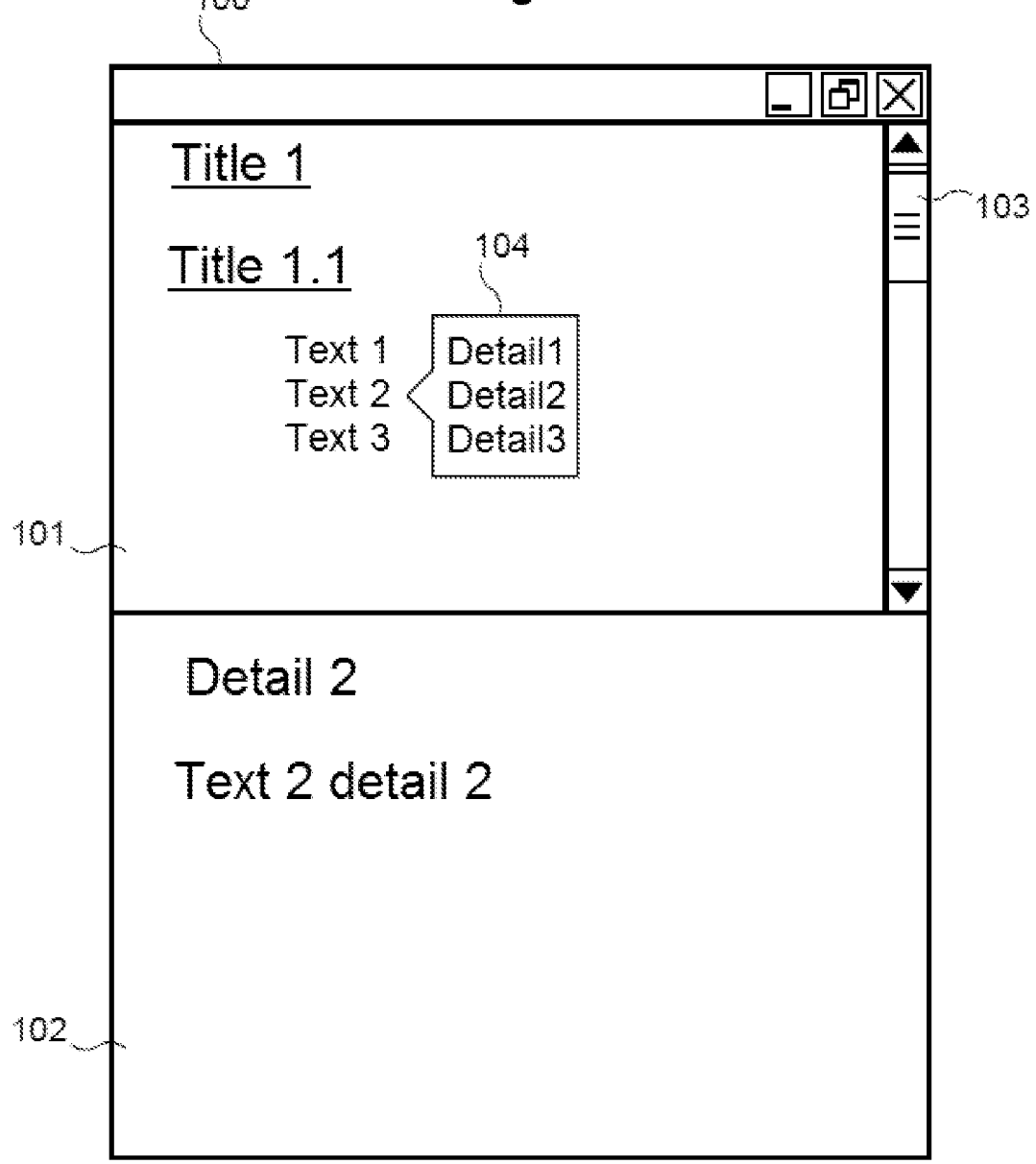
FIGS. 1 and 2 illustrate display windows according to embodiments.

FIG. 1 illustrates a visualization window according to an embodiment.

The window 100 according to FIG. 1 has two sub-windows 101 and 102.

The sub-window 101 is the main visualization window in which the document is displayed for the user according to a predefined detail level. For example, during the opening of the file, the user is asked to specify the detail level desired for displaying the data. For example also, there is a default detail level.

The user can then consult the document by scrolling through the window with a scrollbar 103.

A box 104 is presented to the user for changing the detail level relating to an element of the document. For example, this box is displayed when the user passes a cursor (a "mouse") over the element in question. In the illustration according to FIG. 1, it is assumed that the user has selected the element "text2" (this is for example text, an image or other element7), for example by positioning a mouse over this element. The box 104 is then displayed and indicates three increasing detail levels that are available for this element (Detail1, Detail2 and Detail3).

The sub-window 102 is the detail window for displaying an element selected by the user according to the detail level selected by the user.

In the example of FIG. 1, the user has selected the element "text2". It is assumed that in the box 104, he has selected the detail level "Detail2". In the sub-window 102 data "Text2_detail2" (text, images, or other data) are then displayed detailing the element "text2".

Figure 2:
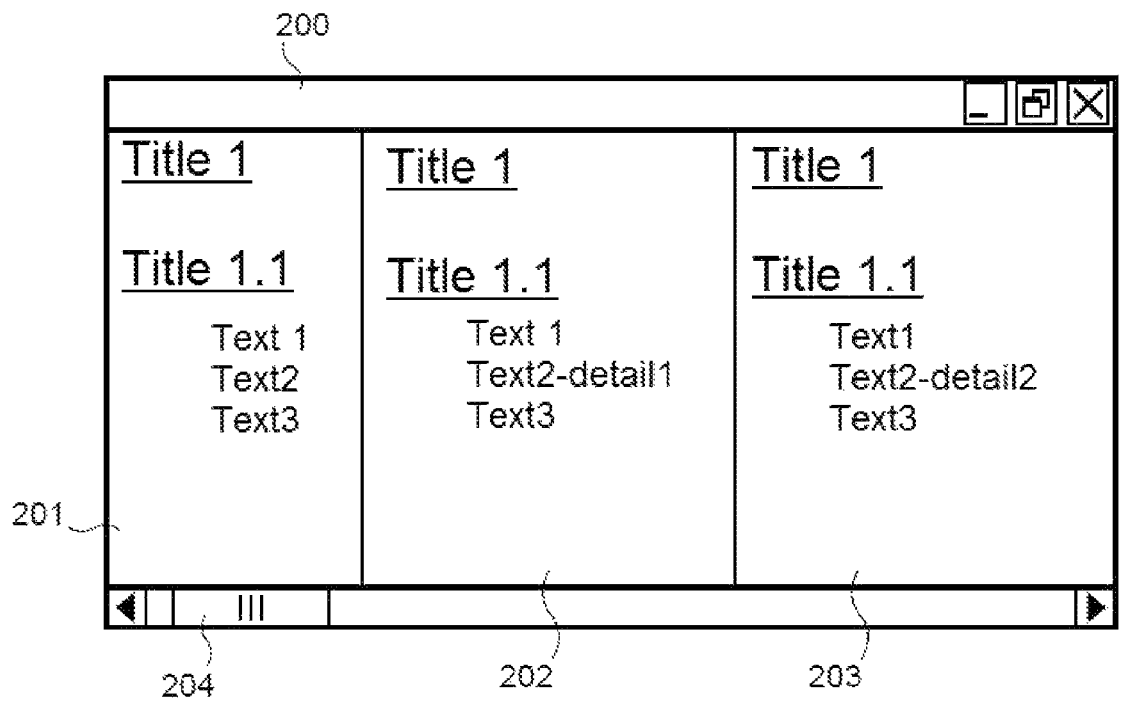

FIG. 2 illustrates another embodiment example of a visualization window.

The window 200 according to the example of FIG. 2 simultaneously displays the different detail levels available for the file. In the interests of clarity, only the element "text2" is detailed in this visualization window.

The document displayed in the sub-window 101 of FIG. 1 is found again in box 201.

A box 202, adjacent to box 201, displays the document with the detail level "Detail1" for the element "Text2". Thus, instead of the element "Text2", the element "Text2_detail1" is found, which details the element "Text2".

A box 203, adjacent to box 202, displays the document with the detail level "Detail2" for the element "Text2". Thus, instead of the element "Text2", the element "Text2_detail2" is found, which details the element "Text2", rather than the element "Text2_detail1".

It is possible to access another box (not shown) adjacent to box 203 by using a scrollbar 204.

This box (not shown) displays the document with a detail level "Detail3" for the element "Text2". Thus, instead of the element "Text2", this box displays the element "Text2_detail3" which details the element "Text2", rather than the element "Text2_detail2".

Figure 3:
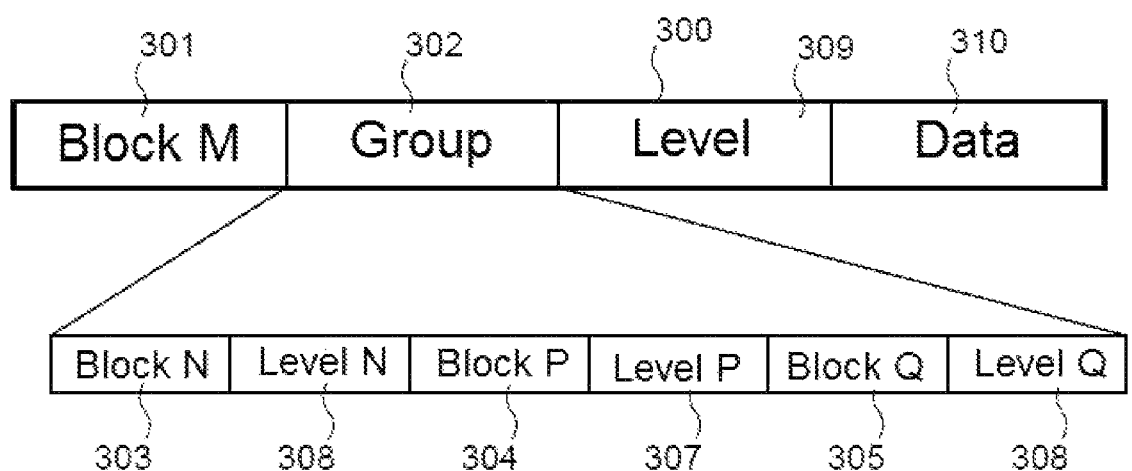
FIG. 3 is a diagram illustrating a data format according to an embodiment.

FIG. 3 illustrates a data structure making it possible to represent a file for a display as discussed above.

This data structure can be saved on a data medium such as for example a CD-ROM, a DVD-ROM, a USB key, a hard disk, or other medium.

The data structure 300 of FIG. 3 represents a part of a documentation data file. A file can comprise several elements 300, as discussed with reference to FIG. 3.

A data section 301 stores an identification of a data block. For example, this data block relates to an element of a document represented by the file of which the block forms part. Returning to the illustrations in FIGS. 1 and 2, this block can for example represent an element such as "Text2". This may be text, image, spreadsheet or other data. The identification of the data block is for example a number in binary or hexadecimal code.

A data section 302 stores a documentation link marker of the data block with other data blocks of the file of which the block forms part. The link marker comprises one or more data sub-sections 303, 304 and 305 identifying data blocks linked to the block identified in the data section 301. The link marker also comprises one or more data sub-sections 306, 307 and 308, respectively associated with the sub-sections 303, 304 and 305, identifying a detail level associated with the linked data blocks.

Returning to the example of FIGS. 1 and 2, the data section 301 can identify the element "Text2", and the data sections 303, 304 and 305 can respectively identify the elements "Text2_detail1", "Text2_detail2" and "Text2_detail3". The sections 306, 307 and 308 then identify the detail levels "Detail1", "Detail2" and "Detail3" respectively.

A data section 309 stores a detail level associated with the data block identified in the section 301. This is for example a level in binary or hexadecimal code.

Finally, a data section 310 stores the actual data of the data block. These are for example text data, image data, spreadsheet data, or other data.

Figure 4:
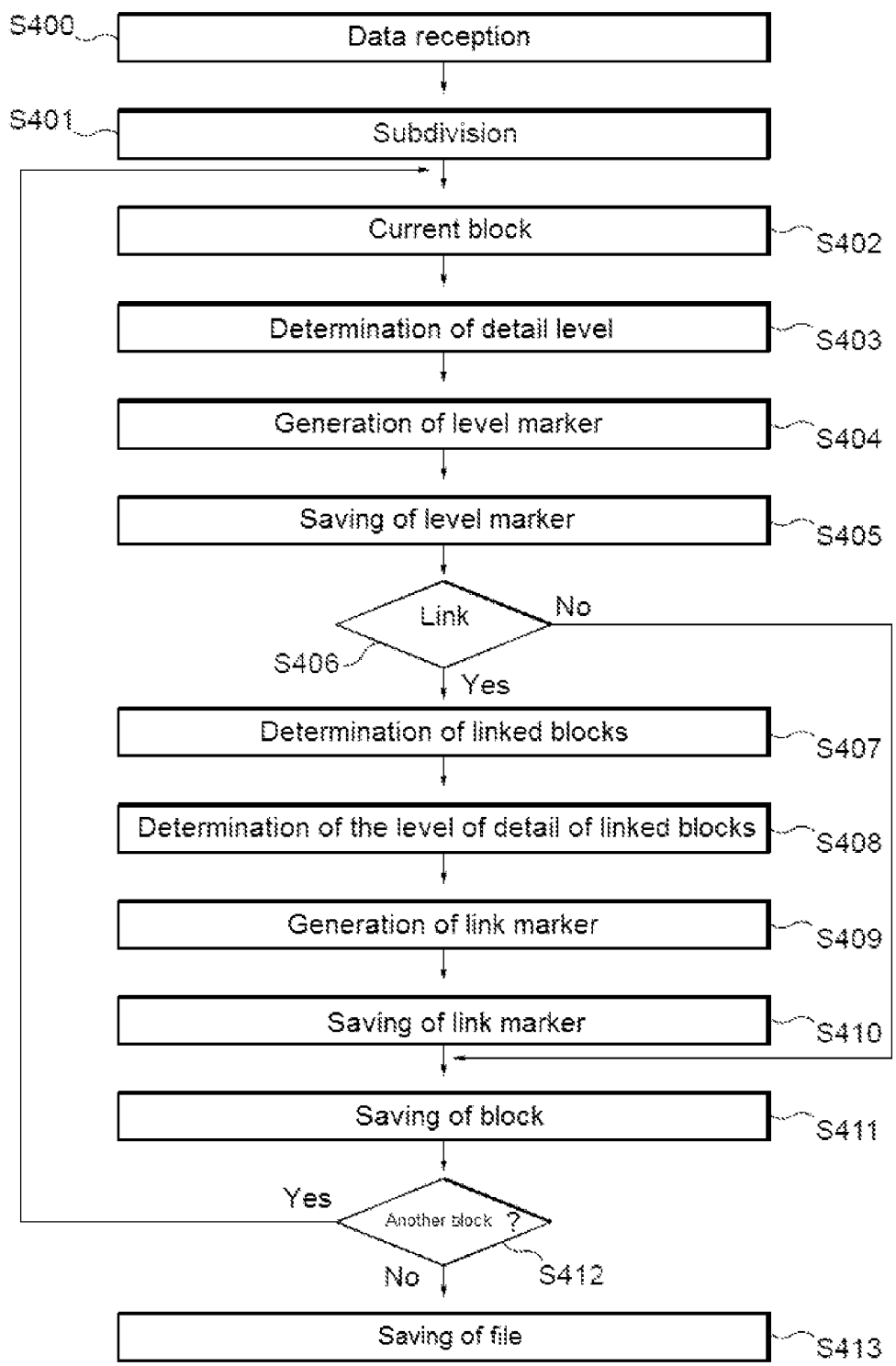
FIGS. 4 and 5 are flowcharts of steps implemented according to embodiments.

FIG. 4 is a flowchart of steps implemented during a method for saving a documentation data file according to embodiments. These steps can for example be implemented in order to generate a data structure according to FIG. 3.

In a first step S400 documentation data are received for saving in a documentation data file. These are for example text, image, spreadsheet or other data. These data are for example generated using word-processing software.

Then, during a step S401, the data received are subdivided into data blocks. For example, a user having produced the document represented by the file received in step S400 has placed specific markers making it possible to recognize document parts to be considered as an element (for example, with reference to FIGS. 1 and 2, the user identifies elements such as "Text2").

For example, if the data are generated by word-processing software, the specific markers can be placed via this software. In this case, the software comprises a functionality for associating a detail level with a section of the document. Thus, the editor of the document can, for example, subsequently prepare two (or more) versions of one and the same document part (for example a paragraph) with different detail levels and associate a corresponding detail level with each of these versions. Thus, during the display of the document, one or other of these versions is displayed, depending on the reader's choice. These markers can also allow the user to make links between parts of the document. For example, instead of creating versions sequentially, the editor can create them in another order then link them subsequently.

Returning to FIG. 4, during step S402, a current data block is selected. Its detail level is determined during step S403. For example, this detail level is determined depending on the specific markers placed by the user. In this case, besides the subdivision of the document, the markers indicate the detail level of the subdivisions.

This detail level is then encoded and a level marker is generated during step S404. This marker is then saved during step S405. For example, a data section 309 as discussed with reference to FIG. 3 is generated then saved in a memory.

Then, it is determined during step S406 whether the current data block is linked to another data block in the document. Once more, the markers placed by the user can be used for this purpose.

If the current block is linked to one or more other blocks (YES), this linked block or these linked blocks are determined during step S407. This involves for example determining their identifiers or their position in the data to be saved.

The detail level of the linked blocks is then determined during step S408. A link marker is then generated during step S409 then saved during step S410. For example, this involves generating and saving a data section 302 as described with reference to FIG. 3.

During step S411, the data block is saved. This involves, for example, saving the data of the block in a section 310 as described with reference to FIG. 3. During this step, an identifying block can also be saved (section 301 of FIG. 3).

During step S406, if no connection to another block is determined (NO), the user passes directly to step S411. In this case, the section 302 can be empty or comprise a code indicating that the data block is not linked to any other block.

Once step S411 has been executed, it is determined during a step S412 whether there are other blocks to be saved.

If this is the case (YES), the user returns to step S402 in order to process another block. If this is not the case (NO), the file is saved by associating all of the data blocks and markers generated. For example, this involves creating a table compiling memory addresses where each of the data blocks and their markers are stored. For example, these are the memory addresses corresponding to blocks as described with reference to FIG. 3 and constituting the complete file.

Figure 5:
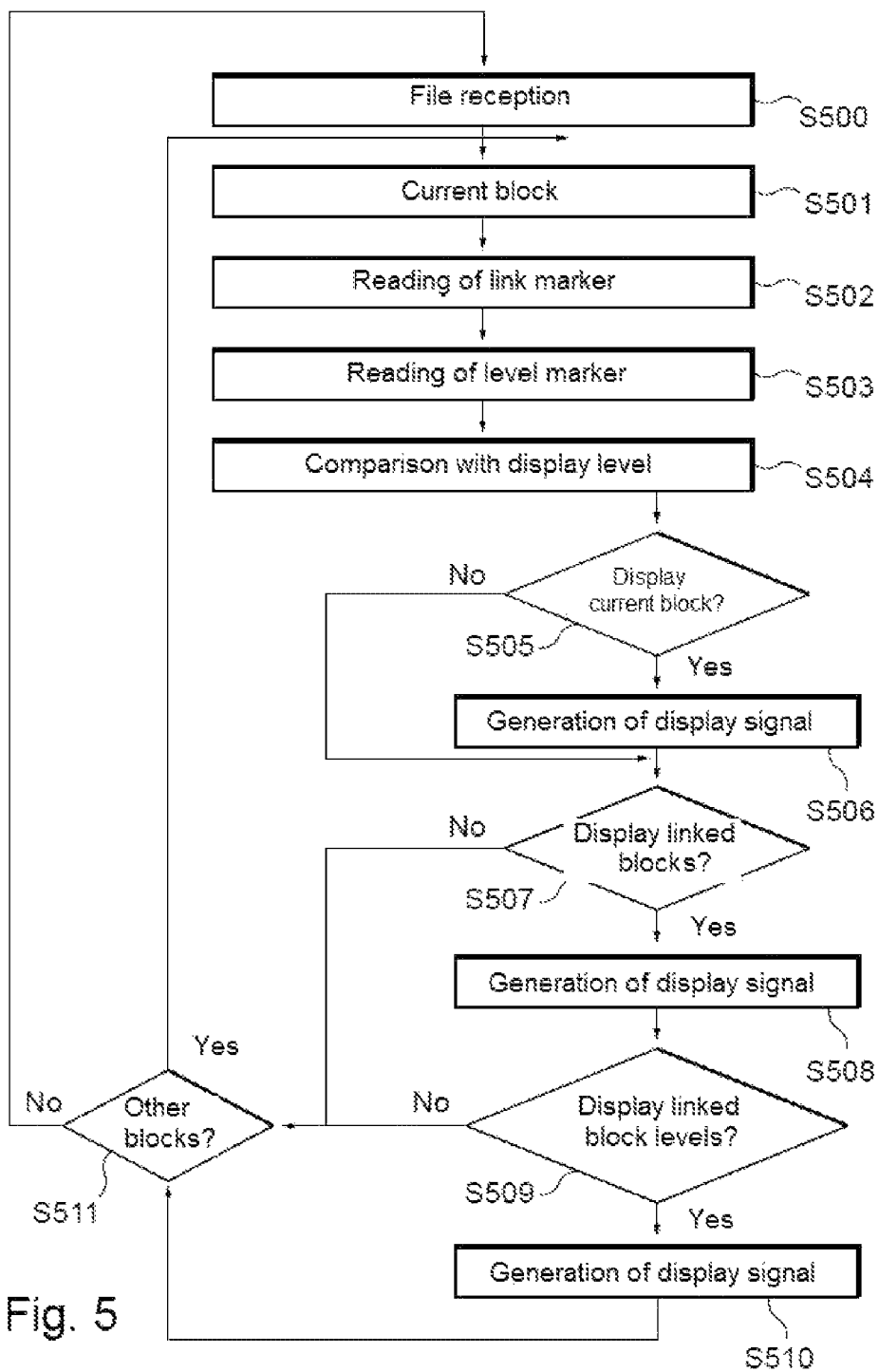

FIG. 5 illustrates steps implemented during a display method according to embodiments.

A documentation data file is received during a step S500. Then, a current data block is selected during step S501.

A link marker associated with the data block (for example the data section 302 of FIG. 3) is read during step S502. A level marker associated with the data block (for example the data section 309 of FIG. 3) is read during step S503.

Once these markers have been read, it may be possible to determine all of the blocks linked to the current block and their detail levels. It may also be possible to determine the detail level of the current block.

During a step S504, the detail level of the current block is compared with the detail level desired for displaying the documentation file data. During this step, the detail levels of the linked blocks can also be compared with the detail level desired for display.

Once step S504 has been executed, it may be possible to determine, for a part (or element) of the document represented by the file received during step S500, which is the relevant block with respect to the desired detail level.

During step S505, it is determined whether the current data block must be displayed. For example, this involves determining whether its detail level corresponds to the detail level desired for displaying the data.

If this is the case (YES), a display signal is generated during step S506 in order to cause the data (text, image or other) of the current data block to be displayed, for example on a screen.

If this is not the case (NO), the user passes directly to step S507, without executing step S506.

During step S507, it is determined whether one of the linked blocks must be displayed, for example whether one of these blocks has a detail level compatible with the detail level desired for displaying the data.

If this is the case (YES), a display signal is generated during step S508 in order to cause the data (text, image or other) of the linked data block corresponding to the desired display level to be displayed, for example on a screen.

If this is not the case (NO), the user passes directly to step S511 in order to determine whether there are other data blocks to be processed in the file.

After step S508, a step S509 can be implemented in order to determine whether it is necessary to display the level of other linked blocks (for example to display a box 104, as described with reference to FIG. 1). This determination can for example depend on a display configuration of the user or on a response from the user to a question in a graphical interface.

If the display of the detail levels of the other blocks is not desired (NO), the user passes to step S511, already described.

Otherwise (YES), a display signal is generated during step S510 for displaying these levels. For example, this signal can cause the box 104 described with reference to FIG. 1 to be displayed. The user then passes to step S511.

During step S511, if it is determined that there are other blocks to be processed in the file (YES), the user returns to step S501 in order to process a subsequent block. Otherwise (NO), the user returns to step S500 to await a new file.

Computer programs for implementing methods according to embodiments can be produced in particular based on the flowcharts of FIGS. 4 and 5 and the present detailed description.

A saving or display device according to embodiments is described with reference to FIG. 6.

Figure 6:
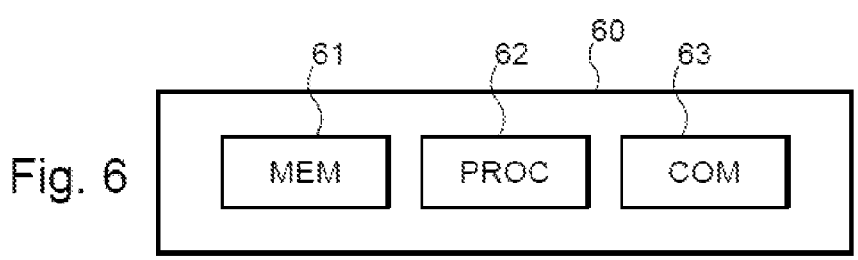
FIG. 6 diagrammatically illustrates a device according to embodiments.

The device 60 of FIG. 6 comprises a memory unit 61 (MEM). This memory unit comprises a random access memory for temporary storage of the calculation data used during the implementation of a method, according to various embodiments. The memory unit also comprises a non-volatile memory (for example of the EEPROM type) for storing for example a computer program, according to an embodiment, for its execution by a processor (not shown) of a processing unit 62 (PROC) of the device. For example, the memory unit can store a documentation data file as described previously.

The device also comprises a communication unit 63 (COM), for example for receiving documentation data files and/or for sending display signals to a screen (not shown). The communication unit can also make it possible to communicate with an external storage device (hard disk, CD-ROM reader, DVD-ROM reader, USB key, or other device).

The present application has been described and illustrated in the present detailed description with reference to the attached figures. However the present application is not limited to the embodiments presented. Other variants and embodiments can be deduced and implemented by a person skilled in the art on reading the present description and from the attached figures.

For example, the data format described with reference to FIG. 3 has been given by way of example only; other formats can be envisaged. In particular, a documentation data file according to embodiments can take the form of a file in XML ("eXtended Markup Language") format.

Such a file is illustrated below with reference to FIG. 7 and to Annexes 1 and 2.

Figure 7:
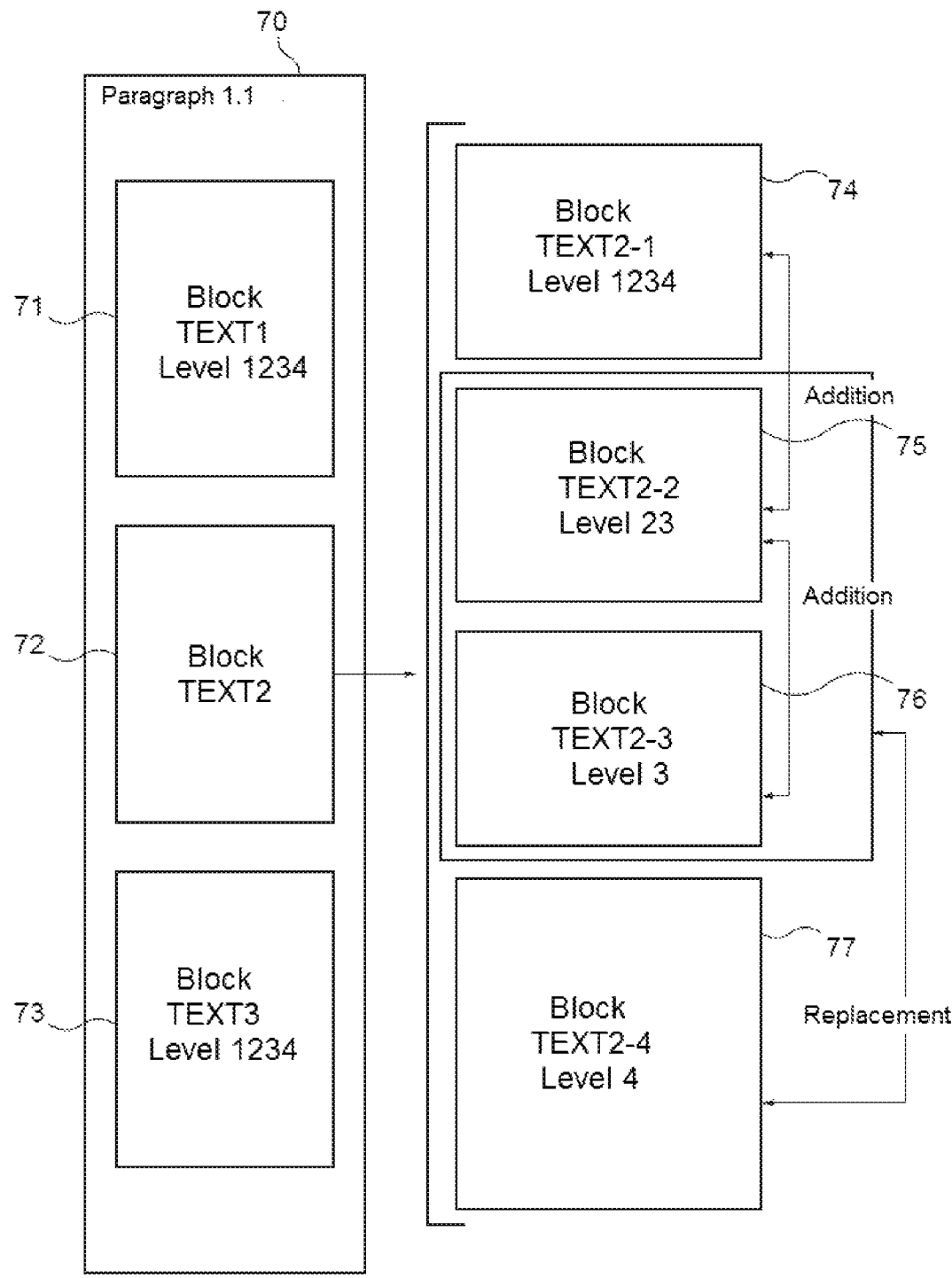
FIG. 7 schematically illustrates a subdivision of documentation data into data blocks that are each associated with one or more detail levels, according to one or more embodiments.

With reference to FIG. 7, the non-limitative example of the addition of a user and his integration into a computer is given. This involves describing a documentation part, for example 1.1 (i.e., Title 1, number 1).

It is assumed that paragraph 1.1 is described by a data block 70, itself comprising data blocks 71 (TEXT1), 72 (TEXT2) and 73 (TEXT3).

For example, four detail levels are available for displaying paragraph 1.1. It is assumed that data blocks 71 and 73 are associated with all the detail levels (1, 2, 3 and 4). Thus, they are displayed irrespective of the detail level selected for the display.

Block 72 can be made up of different combinations of data blocks according to the selected detail level.

Each detail level is associated with one or more data blocks. Each data block is associated with a detail level.

Thus, in the example of FIG. 7, the first detail level (Level 1) comprises blocks 71 and 73 as well as a text data block 74 (TEXT2-1) constituting block 72.

For example, in this first detail level, only the sequence of the instructions (optionally accompanied by default values) is presented, with little or no explanation. In such a detail level, which may be denoted "condensed level", block 74 may be:

"Execute the action: Add a test user and make him available on the cluster using the available network services."

The second detail level (Level 2) comprises blocks 71 and 73 and, in order to make up block 72, the first block 74, followed by another data block 75 (TEXT2-2). For example, block 75 is a text data block but it could be another type of data such as for example image or other data.

In this second detail level, in block 72, besides the information provided by block 74, brief explanations can be presented relating to the purpose of the instructions and the choice of the default values. In such a detail level, which may be denoted "simplified level", block 75 may be:

"The file system is managed by an NFS server configured on the management node. The authentication is managed by an NIS server configured on the management node."

The third detail level (Level 3) comprises blocks 71 and 73 and, in order to make up block 72, the first block 74, followed by the second block 75, itself followed by another data block 76 (TEXT2-3). For example, block 76 is a text data block but it could be another type of data such as for example image data, a combination of different types of data or other data.

In this third detail level, besides the information provided by blocks 74 and 75, alternative operations and/or adjustments of certain parameters may be presented. In such a detail level, which may be denoted "detailed level", block 76 may be:

"The standard Linux commands are available.

As super user, execute the user addition command specifying the group and working directory parameters:

```
useradd -g test_group_ number -d
/directory_export_nfs/test test
```

As super user, execute the password change command for the new user created:

```
passwd test
    Changing password for user test
    New UNIX password: test
    Retype new UNIX password:
    passwd: all authentication tokens updated
    successfully.
```

As super user, execute the NIS authentication base update command. For this, in the /var/yp directory, execute the following command:

```
cd /var/yp
make
    gmake[1] : Entering directory
    '/var/yp/nwadmin'
    Updating netid.byname...
    gmake[1]: Leaving directory
    '/var/yp/nwadmin'"
```

Passing from one detail level to another does not necessarily mean the addition of a new data block following previous data blocks of previous levels. Thus, for example, the fourth detail level (Level 4) comprises block 71, block 73 and, in order to make up block 72, the first block 74, followed by a fourth data block 77 (TEXT4). The fourth detail level does not therefore comprise blocks 75 and 76 here. Block 77 is substituted for these blocks. For example, block 77 is a text data block but it could be another type of data such as for example image data, a combination of different types of data or other data.

In this fourth detail level, in block 72, in addition to the information provided by block 74, detailed explanations and fine adjustments may be presented. In such a detail level, that may be denoted "complex level", block 77 may be:

"The standard Linux commands and services are available.

This user must be identical (id, guid, home) throughout the entire cluster.

If you do not have access to a global authentication service, you may for example use NIS from the management node. In order to install an NIS server, install the package containing the ypserv daemon (the name of the package depends on your distribution) and proceed to the configuration and start-up of the service with the appropriate command. On the calculation nodes side, the NIS client is often named ypbind; install the corresponding package and enter the parameters that you have used for the configuration of the server in its configuration file (/etc/yp/yp.conf) and start it. Once the NIS structure is in place, the use of the command make in the /var/yp directory of the NIS server, will proceed to the filling of the NIS bases using as source the local authentication files (/etc/passwd /etc/group and /etc/shadow) on the server.

Note In order to find the number of the test group, consult the /etc/group file of the management node. For this temporary user it is not necessary to use a specific id, the default value can be retained For reasons of performance you can also use a local authentication at each calculation node, which will avoid the network requests during access. The procedure consists of creating a user locally on the server and entering the lines corresponding to him in the /etc/passwd /etc/group /etc/shadow files in the same client files.

Note If you make this choice, be sure not to ovewrite a client's authentication files with those of a server; the users are not identical on these two different types of installation and the pure and simple replacement of the authentication files is not recommended We do not describe in detail here the installation of an LDAP server; if you decide to use LDAP, refer to the available documentation on the management node. This user's working directory must be found on a file system accessible to all the nodes of the cluster. If such a file system does not already exist, you can add one. In this case, we recommend the use of the NFS server installed by default on the management node. Modify the file /etc/exports of the server and re-export its content with the command exportfs. On the client side, the NFS client is natively available, use the command mount in order to mount and access the file system exported from your server.

In case of difficulty refer to the manual at the line accessible using the command man."

In order to determine which data block to display for a given detail level, each block can be associated with one or more detail levels. Thus, for example, block 74 is associated with the four detail levels, block 75 is associated with levels 2 and 3, block 76 is associated with level 3 and block 77 is associated with level 4.

It is possible to consider that the documentation generated according to embodiments is made up only of chapters (for example: Warning, Preface, Chapters, Annexes or others) and paragraphs. For example, the structure is fixed and a paragraph or a chapter which contains nothing for the current level is displayed empty (this is the case where there is a paragraph or a chapter which comprises only complex level data blocks while it is the simplified level which is required for the display).

Annexes 1 and 2 give implementation examples. Annex 1 gives a DTD ("Document Type Definition") grammar and Annex 2 gives an example of an XML file.

A person skilled in the art is able, on reading these annexes, to recognize the structure described above with reference to FIG. 7. In particular, he will find the different detail levels (1, 2, 3 and 4) associated with the data blocks (TEXT1, TEXT2-1, TEXT2-2, TEXT2-3, TEXT2-4 and TEXT3).

In the claims, the term "comprise" does not exclude other elements or other steps. The indefinite article "a" does not exclude the plural. One single processor or several other units can be used for implementing the embodiments. The different features presented and/or claimed can be advantageously combined. Their presence in the description or in different dependent claims does not in fact exclude the possibility of combining them. The reference signs are not to be understood as limiting the scope of the invention.

ANNEX 1

Example of DTD grammar
<!DOCTYPE document [
<!ELEMENT document (chapter+, blocks)>
<!ELEMENT chapter (paragraph+)>
<!ELEMENT paragraph (block_id*)>
<!ELEMENT block_id (#PCDATA)>
<!ELEMENT blocks (block+)>
<!ELEMENT block (level, connections?, content)>
<!ELEMENT level EMPTY>
<!ELEMENT connections (link*)>
<!ELEMENT link EMPTY>
<!ELEMENT content ANY>
<!ATTLIST document title CDATA #REQUIRED
reference CDATA #REQUIRED>
<!ATTLIST chapter
title CDATA #REQUIRED
number CDATA #REQUIRED>
<!ATTLIST paragraph
title CDATA #REQUIRED
number CDATA #REQUIRED>
<!ATTLIST block block_id CDATA #REQUIRED>
<!ATTLIST force level CDATA "1">
<!ATTLIST link
block_id CDATA #REQUIRED
force CDATA #REQUIRED>
]>

ANNEX 2

Example of XML file
<!DOCTYPE document SYSTEM "document.dtd">
<document title="Example of documentation file" reference="76A2G303">
    <chapter title="Title 1" number="1">
        <paragraph title="Title 1" number="1">
            <block_id> Net01-001</block_id>
            <block_id> Net02-001</block_id>
            <block_id> Net03-001</block_id>
        </paragraph>
        .
        .
        .
    </chapter>
    .
    .
    .
    <blocks>
        <block block_id="Net01-001">
            <force level="1234" />
            <content>
            TEXT1
            </content>
        </block>
        <block block_id="Net02-001">
            <force level="1234" />
            <connections>
                <block link_id="Net02-002" force="23" />
                <block link_id="Net02-003" force="3" />
                <block link_id="Net02-004" force="4" />
            </connections>
            <content>
            TEXT2-1
            </content>
        </block>
        <block block_id="Net02-002">
            <force level="23" />
            <connections>
                <block link_id="Net02-001" force="1234" />
                <block link_id="Net02-003" force="3" />
                <block link_id="Net02-004" force="4" />
            </connections>
            <content>
            TEXT2-2
            </content>
        </block>
        <block block_id="Net02-003">
            <force level="3" />
            <connections>
                <block link_id="Net02-001" force="1234" />
                <block link_id="Net02-002" force="23" />
                <block link_id="Net02-004" force="4" />
            </connections>
            <content>
            TEXT2-3
            </content>
        </block>
        <block block_id="Net02-004">
            <force level="4" />
            <connections>
                <block link_id="Net02-001" force="1234" />
                <block link_id="Net02-002" force="23" />
                <block link_id="Net02-003" force="3" />
            </connections>
            <content>
            TEXT2-4
            </content>
        </block>
        <block block_id="Net03-001">
            <force level="1234" />
            <content>
            TEXT3
            </content>
        </block>
    </blocks>
</document>
19364810
111914
19381233
112014

The invention claimed is:

1. A method of saving a file of documentation data intended for display on a screen, the method comprising:
    subdividing, via one or more processors, the documentation data into a plurality of data blocks;
    associating, via one or more processors, first and second detail levels with a first of the plurality of data blocks, the second detail level with a second of the plurality of data blocks, and a third detail level with a third of the plurality of data blocks, wherein the third detail level is not associated with the first data block, wherein the third data block associated with the third detail level has different information than the first and second data blocks, and wherein the first, second, and third detail levels are different from one another; and
    saving, via one or more processors, each of the first, second, and third data blocks with a respective level marker that relates to the associated one or more detail levels for the respective data block, each level marker to be compared with a display detail level that is selected by a user at least from a list comprising the first, second, and third detail levels for displaying data on the screen of a respective one or more data blocks corresponding to a detail level based on the comparison, wherein, upon a user selecting either the first or second detail level, the user is not displayed the third data block and wherein, upon a user selecting the third detail level, the user is neither displayed the first nor the second data block, wherein part of the documentation data file associated with the first data block associated with the first and second detail levels has a data structure that includes a first data section that identifies the first data block within the file, a second data section that stores a link marker of the first data block with at least two other blocks of the file, said second data section also including a data sub-section associated with said two other blocks of the file identifying a respective detail level of each of said two other blocks, said two other blocks associated with the respective detail level corresponding to the first data block associated with said first detail level and the first data block associated with the second detail level respectively, and a third data section that stores content of the first data block.

2. The method according to claim 1, further comprising saving a link marker with the first or second data block in order to make a documentation link to at least one data block of the file other than the first and second data blocks.

3. The method according to claim 1, wherein the link marker with the first or second data block gives a detail level associated with the at least one linked block.

4. The method according to claim 1, wherein at least one of the link marker and the level markers related to the associated one or more detail levels is an item of metadata.

5. A method of displaying documentation data of a file, the method comprising:

comparing, via one or more processors, a level marker, in the file to a display detail level selected from among the plurality of detail levels by a user in order to display one or more of a plurality of data blocks of the file, the level marker relating to one or more of a plurality of different detail levels, wherein a first data block of the plurality of data blocks associated with first and second detail levels of the plurality of detail levels and a second data block of the plurality of data blocks associated with the second detail level have different information than a third data block of the plurality of data blocks associated with a third detail level of the plurality of detail levels, wherein the third detail level is not associated with the first data block; and generating, via one or more processors, based on the comparison, a display signal of data of a respective one or more data blocks corresponding to a particular detail level, if a related level marker for the particular detail level corresponds to the selected display detail level, wherein, upon a user selecting either the first or second detail level, the user is not displayed the third data block and wherein, upon a user selecting the third detail level, the user is neither displayed the first nor the second data block, wherein the first data block associated with the first and second detail levels has a data structure that includes a first data section that identifies the first data block within the file, a second data section that stores a link marker of the first data block with at least two other blocks of the file, said second data section also including a data sub-section associated with said two other blocks of the file identifying a respective detail level of each of said two other blocks, said two other blocks associated with the respective detail level corresponding to the first data block associated with said first detail level and the first data block associated with the second detail level respectively, and a third data section that stores content of the first data block.

6. The method according to claim 5, further comprising determining, from a link marker with the respective data block, in the file, a documentation link with at least one other data block of the file.

7. The method according to claim 6, further comprising generating a display signal of the link.

8. The method according to claim 5, further comprising determining, from the link marker with the respective data block, a detail level of the at least one other data block.

9. The method according to claim 8, further comprising generating a display signal of the detail level of the at least one other data block.

10. The method according to claim 5, wherein at least one of the link marker, an indicator, and the level markers related to the associated one or more detail levels is an item of metadata.

11. The method according to claim 5, wherein the file has been saved according to:

subdividing the documentation data into the plurality of data blocks; and saving at least each of the first, second, and third data blocks with a respective level marker that relates to the associated detail level for the respective data block, wherein each level marker is compared with the display detail level to determine whether to display data of a respective data block corresponding to a detail level on the screen based on the comparison.

12. The method according to claim 5, wherein the documentation data comprises text data.

13. The method according to claim 5, wherein the documentation data comprises image data.

14. The method according to claim 5, wherein the file is in XML (eXtended Markup Language) format.

15. A non-transitory computer readable product encoded with instructions adapted to direct a processor to carry out the method according to claim 1.

16. A device for saving a data file of documentation intended for display on a screen, the device comprising at least one processor configured to execute a predetermined computer program, the at least one processor, when executing the predetermined computer program:

subdivides the documentation data into a plurality of data blocks;

associates first and second detail levels with a first of the plurality of data block, the second detail level with a second of the plurality of data blocks, and a third detail level with a third of the plurality of data blocks, wherein the third detail level is not associated with the first data block, wherein the third data block associated with the third detail level has different information than the first and second data blocks, and wherein the first, second, and third detail levels are different from one another; and saves each of the first, second, and third data blocks with a respective level marker that relates to the associated one or more detail levels for the respective data block, each level marker to be compared with a display detail level that is selected by a user at least from a list comprising the first, second, and third detail levels by a user for displaying data on the screen of a respective one or more data blocks corresponding to a detail level based on the comparison, wherein, upon a user selecting either the first or second detail level, the user is not displayed the third data block and wherein, upon a user selecting the third detail level, the user is neither displayed the first nor the second data block, wherein the first data block associated with the first and second detail levels has a data structure that includes a first data section that identifies the first data block within the file, a second data section that stores a link marker of the first data block with at least two other blocks of the file, said second data section also including a data sub-section associated with said two other blocks of the file identifying a respective detail level of each of said two other blocks, said two other blocks associated with the respective detail level corresponding to the first data block associated with said first detail level and the first data block associated with the second detail level respectively, and a third data section that stores content of the first data block.

17. The device according to claim 16, wherein the at least one processor, when executing the predetermined computer program, saves a link marker with the first or second data block in order to make a documentation link to at least one data block of the file other than the first and second data blocks.

18. The device according to claim 16, wherein the link marker with the first or second data block gives a detail level associated with the at least one linked block.

19. The device according to claim 16, wherein at least one of the link marker and the level markers related to the associated one or more detail levels is an item of metadata.

20. A device for displaying documentation data of a file, comprising at least one processor configured to execute a predetermined computer program, the at least one processor, when executing the predetermined computer program:

compares a level marker, in the file, to a display detail level selected from among the plurality of detail levels by a user in order to display one or more of a plurality of data blocks of the file, the level marker relating to one or more of a plurality of different detail levels, wherein a first data block of the plurality of data blocks associated with first and second detail levels of the plurality of detail levels and a second data block of the plurality of data blocks associated with the second detail level have different information than a third data block of the plurality of data blocks associated with a third detail level of the plurality of detail levels, wherein the third detail level is not associated with the first data block; and generates a display signal of data of a respective one or more data blocks corresponding to a particular detail level, if a related level marker for the particular detail level corresponds to the selected display detail level, wherein, upon a user selecting either the first or second detail level, the user is not displayed the third data block and wherein, upon a user selecting the third detail level, the user is neither displayed the first nor the second data block, wherein the first data block associated with the first and second detail levels has a data structure that includes a first data section that identifies the first data block within the file, a second data section that stores a link marker of the first data block with at least two other blocks of the file, said second data section also including a data sub-section associated with said two other blocks of the file identifying a respective detail level of each of said two other blocks, said two other blocks associated with the respective detail level corresponding to the first data block associated with said first detail level and the first data block associated with the second detail level respectively, and a third data section that stores content of the first data block.

21. The device according to claim 20, wherein the at least one processor, when executing the predetermined computer program, determines, from a link marker with the respective data block, in the file, a documentation link with at least one other data block of the file.

22. The device according to claim 21, wherein the at least one processor, when executing the predetermined computer program, generates a display signal of the link.

23. The device according to claim 20, wherein the at least one processor, when executing the predetermined computer program, determines, from the link marker with the respective data block, a detail level of the at least one other data block.

24. The device according to claim 23, wherein the at least one processor, when executing the predetermined computer program, generates a display signal of the detail level of the at least one other data block.

25. The device according to claim 20, wherein at least one of the link marker, an indicator, and the level markers related to the associated one or more detail levels is an item of metadata.

26. The device according to claim 20, wherein the file is saved by:

subdividing the documentation data into the plurality of data blocks; and saving at least each of the first, second, and third data blocks with a respective level marker that relates to the associated detail level for the respective data block, each level marker is compared with the display detail level to determine whether to display data of a respective data block corresponding to a detail level on the screen based on the comparison.

27. The device according to claim 16, wherein the documentation data comprises text data.

28. The device according to claim 16, wherein the documentation data comprises image data.

29. The device according to claim 16, wherein the file is in XML (eXtended Markup Language) format.

30. The method according to claim 1, further comprising displaying a box to the user for performing a selection at least from among the first and second detail levels.

31. The method according to claim 30, wherein the box is displayed when the user passes a cursor or mouse over the first or second data block.

32. The method according to claim 31, wherein each of the first and second detail level have a corresponding designated order of detail and the selectable elements of the box representing at least the first and second detail levels are displayed in the box in an order of increasing or decreasing detail.

33. The method according to claim 1, wherein the different information is designated as more detailed than information of either the first or second data block.

34. The method according to claim 1, wherein the first and second detail levels specify lower detail levels than the third detail level.

35. The method according to claim 1, wherein the first, second, and third detail levels respectively and increasingly specify an amount of detail that is to be displayed with respect to an associated data block.

* * * * *